United States Patent
Grimm et al.

(10) Patent No.: US 10,741,081 B2
(45) Date of Patent: Aug. 11, 2020

(54) REMOTE PARK ASSIST SYSTEM

(71) Applicant: GM Global Technology Operations LLC, Detroit, MI (US)

(72) Inventors: Donald K. Grimm, Utica, MI (US); Shuqing Zeng, Sterling Heights, MI (US); Upali P. Mudalige, Oakland Township, MI (US); Robert A. Bordo, Harrison Township, MI (US); Perry L. Maniaci, Clinton Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 350 days.

(21) Appl. No.: 15/812,422

(22) Filed: Nov. 14, 2017

(65) Prior Publication Data

US 2019/0147744 A1    May 16, 2019

(51) Int. Cl.
| | |
|---|---|
| *G08G 1/16* | (2006.01) |
| *B60Q 1/52* | (2006.01) |
| *B60Q 5/00* | (2006.01) |
| *B60L 58/12* | (2019.01) |

(52) U.S. Cl.
CPC .............. *G08G 1/166* (2013.01); *B60L 58/12* (2019.02); *B60Q 1/525* (2013.01); *B60Q 5/006* (2013.01)

(58) Field of Classification Search
CPC ......... G08G 1/166; B60L 58/12; B60Q 5/006; B60Q 1/525; B60Q 5/005; B60Q 1/48; B60Q 1/50
See application file for complete search history.

(56) References Cited

U.S. PATENT DOCUMENTS

| | | | |
|---|---|---|---|
| 2009/0146846 A1* | 6/2009 | Grossman | B60R 25/04 340/988 |
| 2013/0257344 A1* | 10/2013 | Millet | G07C 5/0816 320/104 |
| 2016/0229402 A1* | 8/2016 | Morita | B60W 30/17 |
| 2019/0080313 A1* | 3/2019 | Van Wiemeersch | H04W 4/023 |

* cited by examiner

*Primary Examiner* — Nga X Nguyen
(74) *Attorney, Agent, or Firm* — Cantor Colburn LLP

(57) ABSTRACT

Technical solutions are described for vehicle collision prevention for a vehicle when the vehicle is in a parked condition. An example method includes performing a stationary safety monitoring when the vehicle is in parked condition. The stationary safety monitoring includes detecting presence of a moving object within a predetermined region from the vehicle. Further, the method includes, in response to detecting the moving object in the predetermined region initiating a notification for the moving object to prevent collision with the vehicle.

14 Claims, 4 Drawing Sheets

REMOTE PARK ASSIST SYSTEM

The subject disclosure generally relates to a collision avoidance system for a vehicle, and particularly for a vehicle that is parked to avoid a potential collision from a moving object.

Increasingly, vehicles are being equipped with enhanced safety and communication functionality to assist drivers and improve operation. Examples of active safety systems include collision avoidance, adaptive cruise control, lane departure systems, and parking assistance systems, while enhanced communication functions may be provided by onboard telematics and global positioning systems (GPS). However, the safety systems and communication systems typically are not active when the vehicles are not in operation.

Accordingly, it is desirable to provide improved vehicle safety systems that prevent collisions, when a vehicle is not in operation, such as in a parked position, in an ignition off state, or in any other detectable inoperative condition.

SUMMARY

Technical solutions are described for vehicle collision prevention for a vehicle when the vehicle is in a parked condition. An example method includes performing a stationary safety monitoring when the vehicle is in parked condition. The stationary safety monitoring includes detecting presence of a moving object within a predetermined region from the vehicle. Further, the method includes, in response to detecting the moving object in the predetermined region initiating a notification for the moving object to prevent collision with the vehicle.

In one or more examples, detecting the vehicle is in the parked condition includes determining a geographic location of the vehicle, and determining that the geographic location is one from a predetermined list of unsafe locations. Alternatively, or in addition, the detection includes determining that the geographic location is not one from a predetermined list of safe locations.

Further, in one or more examples, in response to detecting the moving object in the predetermined region, the vehicle is autonomously displaced by a predetermined amount.

Further, in one or more examples, sensor wakeup and wakeup frequency is selectively modified based on detection of adjacent static object(s).

In addition to one or more of the features described herein, the stationary monitoring further includes determining a charge level of a power supply of the vehicle, and switching off the stationary safety monitoring in response to the charge level being below a predetermined threshold level. In one or more examples, in response to the charge level being below the predetermined threshold, the vehicle is switched on to charge the power supply to at least the predetermined threshold level.

In one or more examples, the notification for the moving object includes an audible alert from at least one of a horn, a security system, and a chirp system, of the vehicle. Alternatively, or in addition, the notification for the moving object includes a visual alert from a light of the vehicle.

In another exemplary embodiment an active safety monitoring system for a vehicle includes one or more object sensors, one or more alert generators, and a controller coupled with the one or more sensors and the one or more alert generators. The controller performs a stationary safety monitoring when the vehicle is in parked condition. The stationary safety monitoring includes detecting presence of a moving object within a predetermined region from the vehicle. Further, the method includes, in response to detecting the moving object in the predetermined region initiating a notification for the moving object to prevent collision with the vehicle.

In one or more examples, detecting the vehicle is in the parked condition includes determining a geographic location of the vehicle, and determining that the geographic location is one from a predetermined list of unsafe locations. Alternatively, or in addition, the detection includes determining that the geographic location is not one from a predetermined list of safe locations. Further, in one or more examples, in response to detecting the moving object in the predetermined region, the vehicle is autonomously displaced by a predetermined amount. Further, in one or more examples, sensor wakeup and wakeup frequency is selectively modified based on detection of adjacent static object(s).

In addition to one or more of the features described herein, the stationary monitoring further includes determining a charge level of a power supply of the vehicle, and switching off the stationary safety monitoring in response to the charge level being below a predetermined threshold level. In one or more examples, in response to the charge level being below the predetermined threshold, the vehicle is switched on to charge the power supply to at least the predetermined threshold level. In one or more examples, the notification for the moving object includes an audible alert from at least one of a horn, a security system, and a chirp system, of the vehicle. Alternatively, or in addition, the notification for the moving object includes a visual alert from a light of the vehicle.

In yet another exemplary embodiment a vehicle includes a power supply, and an active safety monitoring system that performs a stationary safety monitoring when the vehicle is in parked condition. The stationary safety monitoring includes determining a charge level of the power supply, and in response to the charge level being below a predetermined threshold level, switching off the active safety monitoring system. Further, the stationary safety monitoring includes detecting that the vehicle is in the parked condition, and in response to the vehicle being in the parked condition, detecting presence of a moving object within a predetermined region from the vehicle. Further, the stationary safety monitoring includes, in response to detecting the moving object in the predetermined region, initiating a notification for the moving object to prevent collision with the vehicle.

In one or more examples, detecting the vehicle is in the parked condition includes determining a geographic location of the vehicle, and determining that the geographic location is one from a predetermined list of unsafe locations. Alternatively, or in addition, the detection includes determining that the geographic location is not one from a predetermined list of safe locations. Further, in one or more examples, in response to detecting the moving object in the predetermined region, the vehicle is autonomously displaced by a predetermined amount. Further, in one or more examples, sensor wakeup and wakeup frequency is selectively modified based on detection of adjacent static object(s).

In addition to one or more of the features described herein, the stationary monitoring further includes determining a charge level of a power supply of the vehicle, and switching off the stationary safety monitoring in response to the charge level being below a predetermined threshold level. In one or more examples, in response to the charge level being below the predetermined threshold, the vehicle is switched on to charge the power supply to at least the predetermined threshold level. In one or more examples, the notification for the moving object includes an audible alert from at least one of a horn, a security system, and a chirp system, of the vehicle. Alternatively, or in addition, the notification for the moving object includes a visual alert from a light of the vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
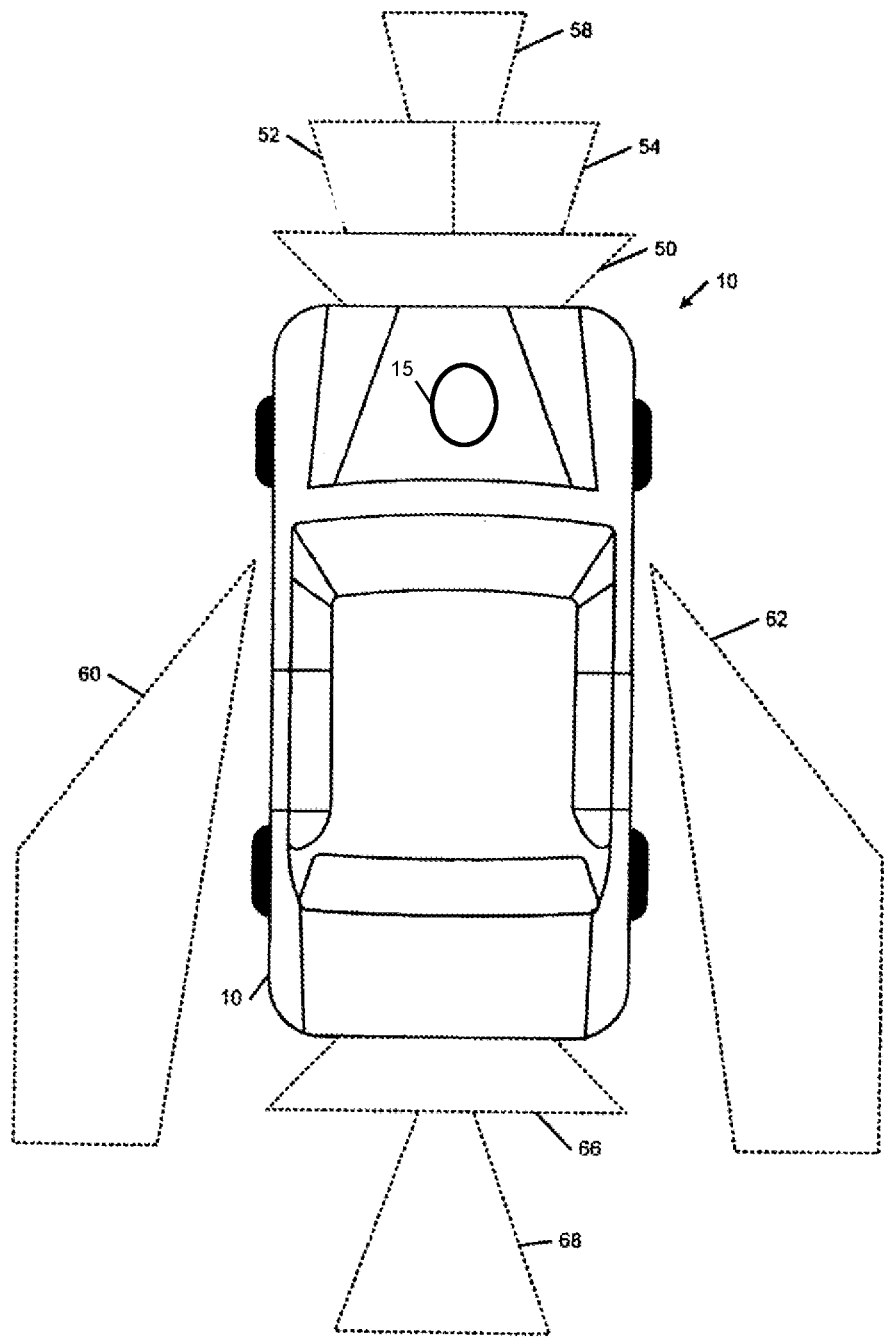
FIG. 1 illustrates a vehicle, active safety zones around a vehicle and active safety systems that monitor the active safety zones according to one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with one or more exemplary embodiments a vehicle includes one or more active safety systems that typically warn a driver of the vehicle of danger that may warrant immediate attention. For example, the active safety systems may include a forward collision warning system that warns a driver of a potential collision with a moving object such as a vehicle or a pedestrian or with a non-moving object such as a building. Other active safety systems include but are not limited to adaptive cruise control, park assist, rear and side object detection, pre-crash detection, pedestrian detection and/or lane departure warning systems.

Each of these active safety systems typically employs one or more sensors such as radar, acoustic and/or optical sensors. For example, the park assist, collision warning and side object detection systems typically include one or more radar sensors that are directed in forward, rearward, and/or side directions. The radar sensors generate output signals that are used to measure a distance and velocity between the vehicle and other moving and/or non-moving objects. The active safety systems may also compute the relative speeds of the vehicle and the objects and/or angles between the vehicle and the objects.

The active warning system triggers audio, visual and/or haptic alarms to alert the driver if needed. Haptic alarms provide physical feedback such as seat vibration. Usually, the audio alarm is generated using the speakers that are associated with a radio system in the vehicle to reduce cost, although other audio output devices may be used. Alternatively, or in addition, dedicated visual indicators and/or visual indicators that are associated with an instrument panel (IP) of the vehicle may also be used. Alternatively, or in addition, external lights of the vehicle, such as indicators, brake lights, headlights, fog lights, or any other lights that the vehicle is equipped with may be used to provide feedback, such as by flashing. The technical solutions described herein use such alarms of a vehicle to alert other vehicles, or drivers of the other vehicles.

Figure 2:
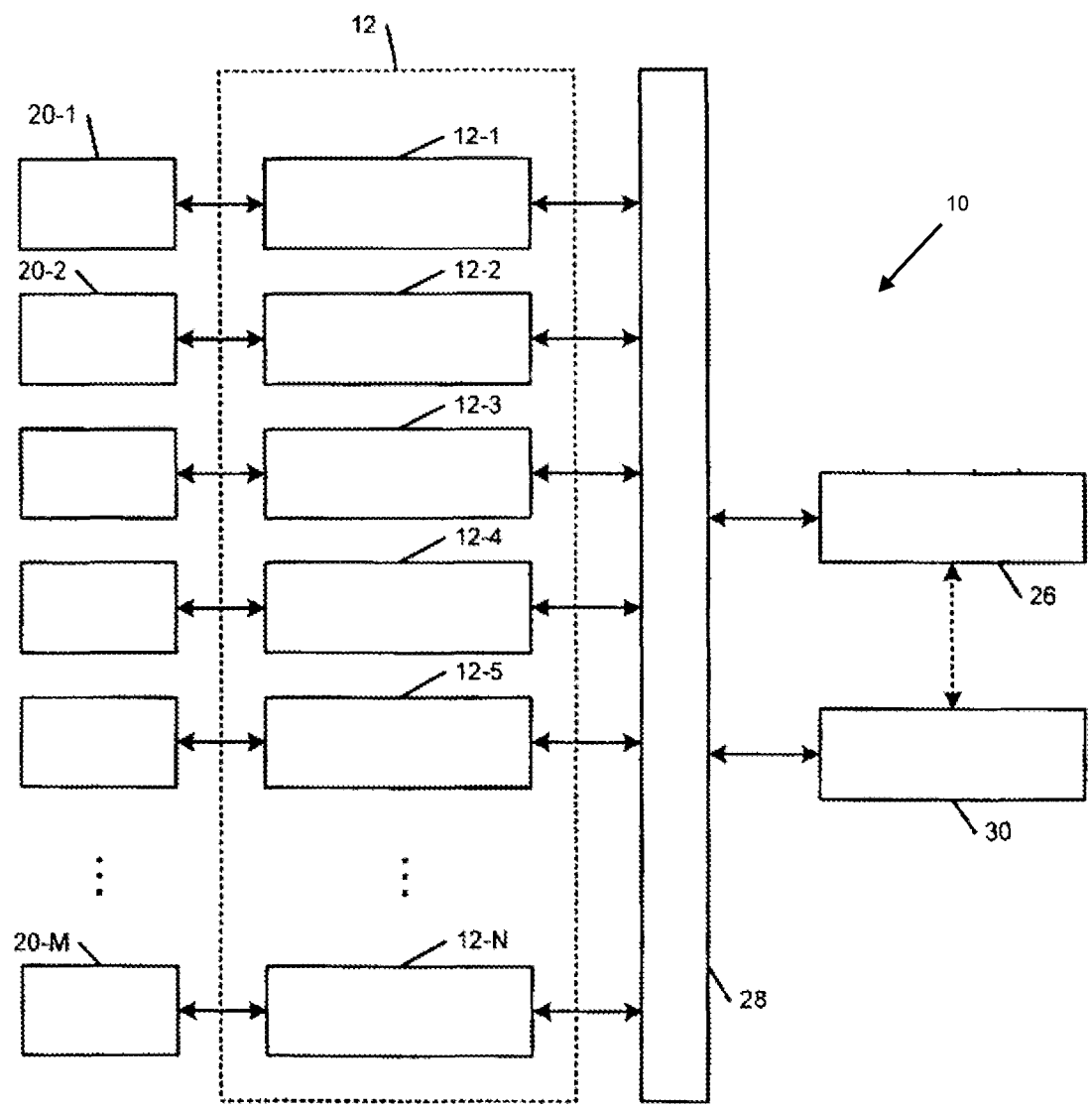
FIG. 2 is a functional block diagram of a vehicle including one or more active safety systems.

FIG. 1 illustrates a vehicle, active safety zones around a vehicle and active safety systems that monitor the active safety zones according to one or more embodiments. Further, FIG. 2 depicts a functional block diagram of the vehicle including the active safety systems.

As depicted, a vehicle 10 includes one or more active safety systems 12-1, 12-2, and 12-N (collectively referred to herein as active safety systems 12). For example, the active safety system 12-1 is a forward collision warning (FCW) system. The active safety system 12-2 is a park assist (CPA) system. The active safety system 12-3 is a side object detection (SOD) system. The active safety system 12-5 is a lane departure warning (LDW) system. As can be appreciated, any other active safety systems 12 in addition to and/or instead of these exemplary active safety systems may be used in other embodiments. Each active safety system can be implemented using dedicated and/or shared controllers with one or more software modules, one or more application specific integrated circuits (ASIC), dedicated discrete circuits, or in any other suitable manner. The vehicle 10 further includes a power supply 15, such as a battery, that provides electric power to the one or more components for operation. The power supply 15 may be charged during the vehicle operation, for example via an alternator (not shown), when the vehicle 10 is plugged into a power outlet for charging, or in any other manner. In one or more examples, the power supply 15 may be a central source for various components in the vehicle 10. Alternatively, or in addition, the power supply 15 is dedicated to the operation of the active safety system 12, and is in addition to a central power source (not shown) used by the other components of the vehicle 10.

The active safety systems 12 may include and/or use one or more sensors 20-1, 20-2, and 20-M (collectively referred to herein as sensors 20) that sense one or more parameters. For example, the sensors 20 may include radar sensors, radio frequency sensors, optical sensors, acoustic sensors, infrared sensors, or any other type of sensors. The sensors 20 may be shared between two or more active safety systems and/or dedicated sensors. The active safety systems 12 analyze the sensed parameters. In addition, other input signals may be provided by other vehicle systems to one or more of the active safety systems. For example, vehicle speed may be input from a vehicle speedometer. Still other signals may be provided such as steering wheel position, engine parameters, wheel slip, traction control signals, transmission control signals, global position and/or map-based signals, accelerator pedal position signals, and/or any other signals. In addition, information from the environment (such as other vehicles) can be remotely communicated to the vehicle.

In one or more examples, the active safety systems 12 include one or more algorithms that receive the input signals, that assess potential hazards in zones outside of the vehicle, and that generate audio, visual and/or haptic alarm signals to alert drivers of the potential hazards. The alarm signals may be output directly to dedicated and/or shared audio, visual and/or haptic indicators that are associated with one or more active safety system. For example, the alarm signals can be output to human machine interaction (HMI) system 26, via a data bus 28, or via the data bus and/or one or more vehicle controllers 30. The HMI system 26 may include one or more audiovisual indicators for providing corresponding warning/alert signals. For example, audio signals may include chirps from door locking components, sounding of a horn, an alarm signal from an exterior speaker, and the like, or a combination thereof. Further, examples of visual signals may include flashing of one or more external lights of the vehicle 10. The flashing of the lights may include particular patterns, such as a predetermined number of flashes per second, a predetermined delay between successive sets of flashes, and the like or a combination thereof. The HMI system 26, in one or more examples, is used differently based on a level of probability of a collision of one or more objects with the vehicle 10.

The active systems 12 facilitate warning an operator of the vehicle 10, who, in response, may take actions by maneuvering the vehicle 10 to avoid a potential collision. Alternatively, or in addition, the active systems 12 may send the signals to an automated driving unit that performs the maneuvers to move the vehicle 10 to avoid the potential collision. A technical challenge exists where the active systems 12 fail to avoid the potential collision in case the vehicle 10 is not movable, for example if the vehicle 10 is in parked mode, the engine of the vehicle 10 is turned off, or any other such condition. In such immovable conditions, the potential collision may be caused by an external object that moves towards the vehicle 10. In such conditions the vehicle 10 may not have an operator, and thus, generating alerts for the operator may be fruitless. The immovable conditions giving rise to the technical challenge may particularly be those in which the power supply 15 is switched off to conserve charge so that the vehicle 10 can be restarted. Thus, the active safety systems 12 are not 'activated' at this time to conserve the charge in the power supply 15.

In one or more examples, the vehicle 10 may be in the parked condition, but movable within specific constraints, such as based on surrounding immovable objects. Upon recognition of such cases, the technical solutions described herein facilitate the parked vehicle 10 to wake up, provide the exterior alarm to alert the other vehicle on a potential collision course, and autonomously move—within the constraints—to avoid the potential collision.

The technical solutions described herein address such technical challenges. The controller 30 implements the technical solutions described herein, in one or more examples. Alternatively, or in addition, the vehicle 10 includes a separate hardware, such as a stationary safety monitoring (SSM) circuit that implements the technical solutions described herein. In one or more examples, the SSM is a module that is part of the controller 30. In one or more examples, one or more computer executable instructions facilitate implementing the technical solutions, where the controller 30 executes the instructions.

In one or more examples, the SSM facilitates the vehicle 10 to provide alerts to the external object on a collision course with the vehicle 10 to take action to avoid colliding with the stationary vehicle 10, such as applying brakes, turning, etc. For example, in parallel, angle, and/or perpendicular parking environments, another vehicle may collide with the vehicle 10 that is already parked, such as when backing up. The SSM facilitates avoiding such collisions. In one or more examples, the SSM employs HMI system 26 of the vehicle 10, particularly the external components, to communicate unsafe backing maneuver to the remote vehicle on a potential collision course with the vehicle 10. Further, the SSM provides crash warning to the remote vehicle that may not equipped with the features of active safety system 12.

The SSM thus facilitates using the active safety system 12 and corresponding sensors 20 to detect remote vehicle threats and generating alerts for the remote vehicle to avoid colliding with the vehicle 10, particularly when the vehicle 10 is powered OFF. The powered off state is when the vehicle 10 is in a parking gear, and/or when the engine of the vehicle 10 is off. One of the technical challenges with detecting such potential remote threats in an inoperative condition is that the active safety system 12 consumes power while vehicle is in the off state. The technical solutions described herein address such technical challenges by facilitating power management that reduces battery consumption when monitoring the vehicle in the off state, and ensures that the power supply 15 is not drained below a predetermined level such that the vehicle 10 is unable to restart.

According to the technical solutions described herein, the controller 30 (or the SSM) selectively activates one or more active safety systems 12, such as the park assist system while the vehicle 10 is parked (and potentially unattended) to monitor the surrounding environment, and further activates the HMI system 26, such as the vehicle lights, vehicle chirp, or vehicle horn if a collision with a remote vehicle is predicted in the parked state, to alert the remote vehicle. In one or more examples, a user activates the SSM for the vehicle 10 manually, for example via a user-interface of the vehicle 10, via a remote device (such as a key fob, mobile phone, computer etc.) that communicate with the controller 30 of the vehicle 10 in a wireless or a wired manner. Alternatively, or in addition, the SSM is activated automatically by the controller 30, for example, if one or more predetermined conditions are met. For example, the predetermined conditions may include the vehicle 10 being in the off state, being parked at one or more particular locations, being away from one or more particular locations, being unattended for a predetermined amount of time, and the like or a combination thereof.

The SSM may include monitoring charge of the power supply 15, and adjusting the monitoring based on a level of charge available. For example, the adjusting may include decreasing a frequency at which the monitoring is activated. Alternatively, or in addition, the adjusting may include switching off the SSM. Alternatively, or in addition, the adjusting may include decreasing/increasing a range in which objects are detected for potential collisions. For example, the range may be adjusted by using selective sensors from the sensors 20, with different range for detecting objects.

In one or more examples, if a first set of sensors, for example on one side of the vehicle 10, detect an adjacent stationary object for a predetermined number of wakeup cycles, such as a wall or other parked vehicle, the first set of sensors are marked as being associated with a 'protected side' of the vehicle 10. Upon such recognition, the controller 30 reduces the frequency of wakeup for the first set of sensors until the vehicle 10 is operated again. In addition, the controller 30 uses a second set of sensors, that are not associated with the "protected" side at the higher duty cycle compared to the first set of sensors.

Using the selective sensors may include activating only a longer range sensor (e.g. radar) and in response to detecting a potential threat at the longer range, activating a shorter range sensor (e.g. ultrasonic). Further, based on the range at which object is detected, the SSM may selectively activate the HMI components to use the available charge optimally.

In one or more examples, the SSM may include adjusting the charging of the power supply 15. For example, the vehicle 10 may be switched to the ON state to cause the engine to charge the power supply 15, to a predetermined level (e.g. 40%), where the SSM operates only if at least the predetermined level of charge is available. Alternatively, or in addition, the battery charging algorithm may be adjusted so that when the vehicle 10 is operating, or when the vehicle 10 is plugged into a power outlet for charging (in case of electric vehicle), the power supply 15 is charged beyond a first predetermined level (e.g. 80%), which may be typically configured to conserve the life of the power supply, and to a second predetermined level (e.g. 90%, 100%) for the SSM to have more charge to operate.

Figure 3:
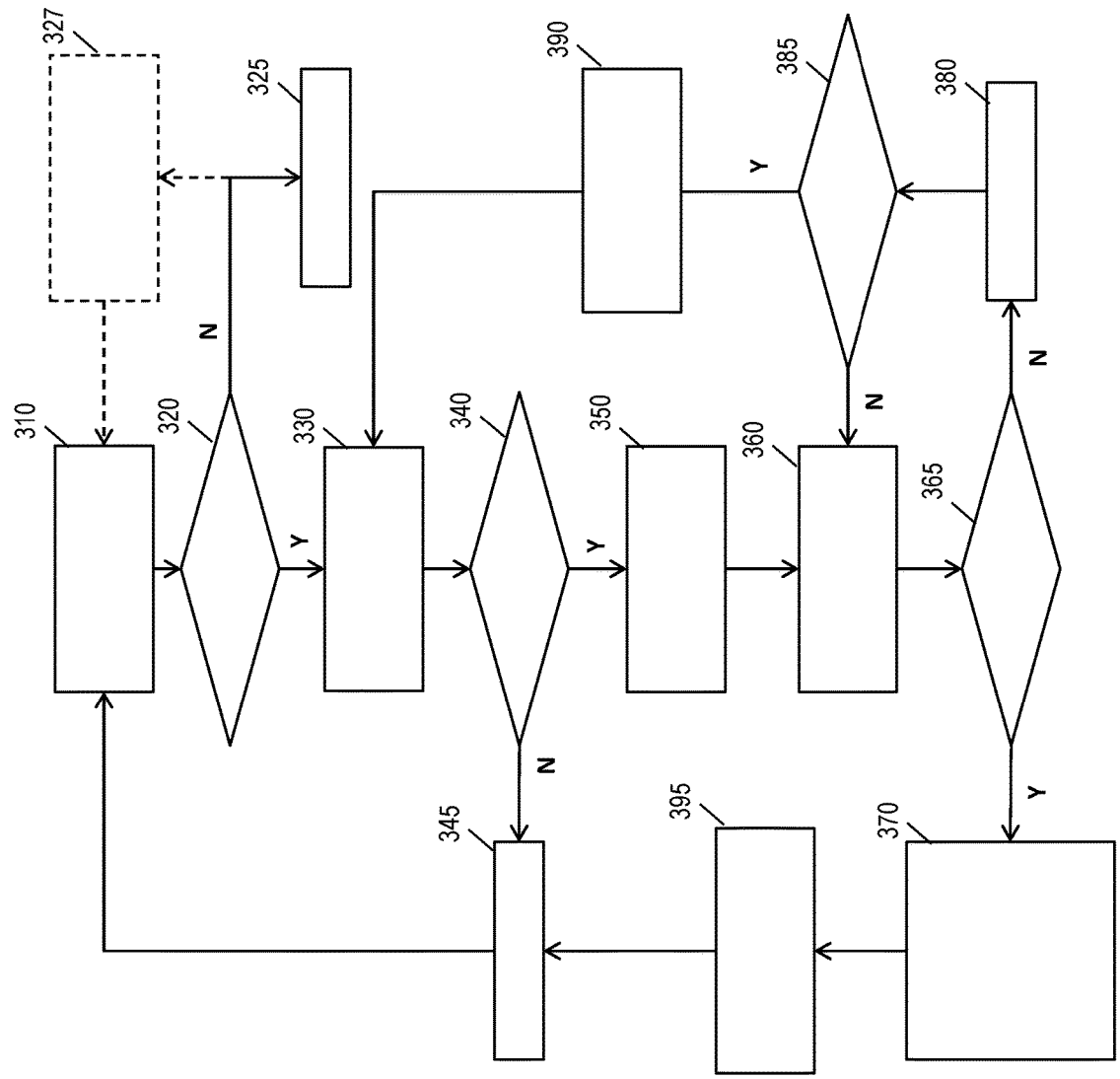
FIG. 3 depicts a flowchart for providing stationary safety monitoring of a vehicle according to one or more embodiments.

FIG. 3 depicts a flowchart for providing stationary safety monitoring of a vehicle according to one or more embodiments. The method may be implemented by the controller 30 using the active safety system 12 and/or the sensors 20. The method includes waking up the one or more components of the vehicle for performing the stationary safety monitor, as shown at block 310. In one or more examples, waking up for the SSM includes supplying power to the one or more components, such as the controller 30, the active safety system 12, the sensors 20, etc.

The wakeup further includes checking if one of the wakeup conditions is met. For example, one of the wakeup conditions may include receiving a manual wakeup command, via a button, or any other user-interface element of the vehicle 10. Alternatively, or in addition, the wakeup command may be received via a remote-controlling device of the vehicle 10, such as a key fob. Alternatively, or in addition, the remote-controlling device may be a mobile device, such as a smartphone, a smartwatch, a tablet computer, or any other computing device that sends the wakeup command via a communication network such as the Internet.

The wakeup may further be performed in response to the vehicle 10 being placed in a parked condition, in which the engine is turned off and/or the vehicle 10 is put in a parking gear. Alternatively, or in addition, the wakeup may be performed in response to the vehicle being in the parked condition for at least a predetermined configurable duration, such as 20 minutes, 40 minutes, 60 minutes, and the like.

Alternatively, or in addition, the wakeup may be performed in response to the vehicle 10 being in the parked condition at a particular location from a predetermined list of locations, that are deemed as 'monitor' locations such as at work, at shopping mall, at an airport, at a public parking, at an event parking, at a restaurant, at a bar, street parking, and the like or a combination thereof. The list of monitor locations may be configurable; for example via the user-interface console of the vehicle 10, or via the remote-controlling device such as the computer. Accordingly, the SSM is activated (wakeup) if the vehicle 10 is in parked condition at one of the monitor locations (or unsafe locations).

The wakeup may be performed in response to the vehicle 10 being in the parked condition, and not being at a particular location from a predetermined list of locations that are deemed as 'non-monitored' locations (or safe location), such as home, charging station, and the like. Accordingly, the SSM is activated (wakeup) if the vehicle 10 is in parked condition and not at one of the non-monitored locations.

The wakeup conditions described above are examples, and other wakeup conditions may be configured in other examples. In one or more examples, the wakeup conditions are used together to wakeup the SSM, and are not mutually exclusive. For example, the SSM is activated (wakeup) if the vehicle 10 is in parked condition and not at one of the non-monitored locations, and if the vehicle 10 has been in the parked condition for at least a predetermined duration.

Referring back to FIG. 3, the method further includes checking that the charge of the power supply 15 is at least at a predetermined level (e.g. B %, B' Watt-hours, or the like), as shown at block 320. The predetermined level is based on amount of charge required to restart the vehicle 10. Thus, the check is performed to ensure that the power supply 15 is not drained by the SSM to not be able to restart the vehicle 10.

If the charge level is below the predetermined level, the SSM is turned off, as shown at block 325. Turning off the SSM may include adjusting the power supply charging algorithm, for example to increase the level to which the power supply 15 is to be charged henceforth. Alternatively, instead of turning off the SSM, if the charge level is below the predetermined level, the method includes turning on the vehicle 10 automatically, as shown at block 327. For example, by operating the engine of the vehicle 10 for a predetermined duration (15 minutes, 30 minutes), the power source 15 is charged to the predetermined level to operate the SSM.

If the charge level is satisfactory, the method includes performing a long range check to detect a moving object within a first range of the vehicle 10, as shown at block 330. The long range detection is performed using a particular sensor/sensors 20, such as a radar, camera, LIDAR or ultrasonic sensor or similar. The first range is a configurable predetermined distance surrounding the vehicle 10. If a moving object is not detected within the long range, the SSM is back to sleep condition, and wakes up after a predetermined duration, such as 5 seconds, 2 seconds, or the like, based on the wakeup conditions described earlier, as shown at block 340 and 345.

If a moving object is detected in the first range of the long range detection, the SSM wakes up the short range detection, as shown at block 340 and 350. Waking up the short range detection includes activating one or more short range detection sensors, such as ultrasonic or short range radars. Alternatively, or in addition, waking up the short range detection includes changing the settings of the sensors that are used for the long range detection, such as a frequency used by the sensors to detect the moving objects.

In one or more examples, the short range detection provides a distance between the moving object and the vehicle 10. Based on the distance, a threat assessment is performed to determine a probability of the moving object colliding with the vehicle 10, as shown at block 360. The threat assessment is performed using one or more threat assessment algorithms currently known or to be developed.

In one or more examples, the threat assessment outputs the probability of the potential collision based on the predicted time to collision (TTC) and estimated driver reaction time. The method includes determining whether to initiate an alert using the HMI 26 based on the TTC value, as shown at block 365. If the TTC is above a predetermined threshold value, for example, 2 seconds, an alert is not generated. Further, a timer is initiated, and for the duration of the timer, the short range threat assessment is continuously performed, as shown at block 380 and 385. The timer is set to a predetermined configurable duration, such as 2 seconds, 5 seconds, and the like. Upon expiration of the timer, the method proceeds to switch off the short range check, as shown at block 390. The short range check consumes more power than the long range check, for example because of more frequent checks being performed. Hence, switching off the short range check optimizes power usage. The method continues to perform the long range check, as described herein, as shown at block 330.

If the TTC for the potential collision is lower than the predetermined threshold value, the SSM determines what kind of alert to generate to cause the moving object to change course, stop moving, or take any other action to avoid the potential collision, as shown at block 370. The alert is generated using one or more external HMI components of the HMI system 26. For example, the alert may be generated activating chirps, horn, alarm system, or any other audible alert generation. Alternatively, or in addition, the alert may be generated by activating parking lights, headlights, taillights, indicators, or any other visual alert generation. In one or more examples, the kind of alert to generate is based on the probability of the potential collision determined by the short range check. Further, in one or more examples, the controller 30 determines that the vehicle 10 is movable within specific constraints, such as based on surrounding immovable objects that are detected using the one or more sensors 20. Upon recognition of such cases, the controller 30 autonomously starts the parked vehicle 10, and autonomously moves the vehicle 10 within the constraints to avoid the potential collision, as shown at block 395.

Figure 4:
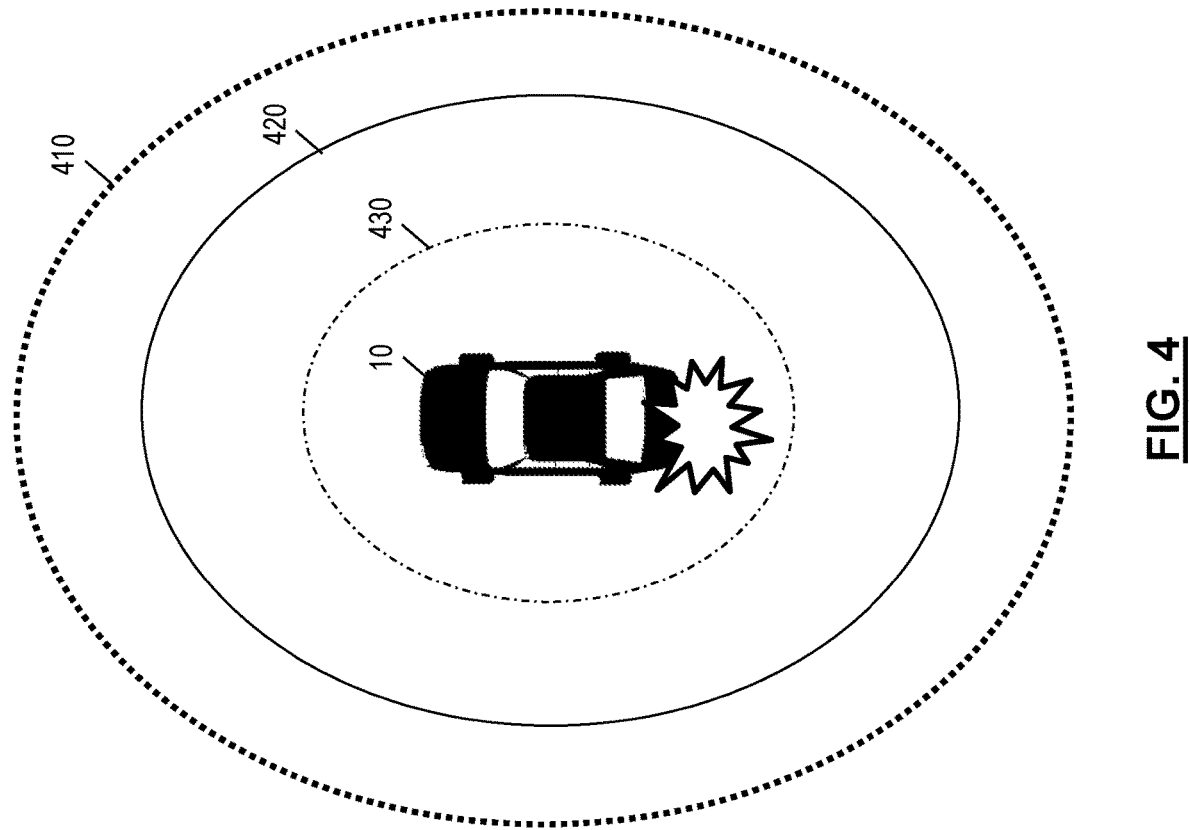
FIG. 4 depicts a visual representation of the threat assessment process and the alert generation process based on the assessed threat level according to one or more embodiments.

FIG. 4 depicts a visual representation of the threat assessment process and the alert generation process based on the assessed threat level according to one or more embodiments. Until the SSM of the vehicle 10, which is in a parked condition, detects a moving object within the predetermined first range 410 using the long range system, the short range detection is kept inactive, and no alert is generated. Upon detecting a moving object, such as another vehicle, a moving person, a moving cart, or any other moving object, the short range check is activated.

The short range check determines the TTC, and/or a probability of the potential collision of the moving object with the vehicle 10, as described herein. In FIG. 4, the region 410 is where the TTC is above a first predetermined threshold, such as 3 seconds, where no alert is generated. If the TTC is below the first predetermined threshold, but above a second predetermined threshold, for example 2.5 seconds, represented by region 420 in FIG. 4, a first type of alert is generated. For example, the first type of alert may include one of the audible alerts, such as chirps. Alternatively, or in addition, the first type of alert may include one of the visual alerts, such as the taillights and headlights.

Further, if the TTC drops below the second predetermined threshold, the moving object entering region 430, a second type of alert is generated. For example, the second type of alert may include additional audible alert, such as the horn. Alternatively, or in addition, the second type of alert may include another visual alert such as flashing the indicator lights, using a predetermined flashing pattern.

Further, in one or more examples, if a collision occurs, the vehicle 10 may activate the external alarm system. The external alarm, in addition to generating audiovisual alerts, may include sending a notification to the user of the vehicle 10. For example, the notification may be sent as an alert on a mobile device, a text message, a phone call, or any other such notification via one or more communication networks. In one or more examples, the notification may be sent to a central server/system, such as ONSTAR™, which further forwards the notification to the user via the communication network(s). In one or more examples, the controller 30 may further initiate operations such as camera capture, detecting and capturing impact details (force, direction), and the like that may be stored for later recovery and analysis.

It should be noted that in the above description the threshold values are few possible examples, and that in other embodiments, different and or fewer/additional threshold values may be used. Further, the types of alerts described are examples, and that in other embodiments, different alerts may be generated in the corresponding regions. In one or more examples, the threshold values and the alert types may be configurable by a user of the vehicle 10. Alternatively, or in addition, the TTC values for remote warnings could be based on calibration values for vehicle park assist/crash warning features.

The technical solutions described herein thus facilitate a safety monitoring and alarm system for a vehicle, particularly which operates when the vehicle is in a parked condition. Further the monitoring may be activated based on one or more wakeup conditions that are user configurable. The monitoring assesses a threat level based on detection of a moving object and a distance of the moving object from the parked vehicle. Based on the assessed threat level, the technical solutions described herein facilitate generating different types of alerts to warn the moving object of the potential collision with the parked vehicle. The alerts can cause the moving object to avoid the potential collision by changing course, stopping, slowing, and taking any other actions. Thus, the technical solutions described herein improve the active safety systems of the vehicle by facilitating operation of the active safety system when the vehicle is in parked condition. Further, the technical solutions described herein thus facilitate improving the safety of the vehicle even when the vehicle is unattended.

Further yet, the technical solutions facilitate the active safety system to monitor power supply charging level when performing the stationary safety monitoring to ensure that the vehicle can be restarted. In one or more examples, the active safety system adjusts the battery charging algorithm and/or settings to facilitate operating the stationary safety monitoring.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for vehicle collision prevention, the method comprising:
   performing a stationary safety monitoring when a vehicle is in a parked condition, the stationary safety monitoring comprising:
       detecting presence of a moving object within a predetermined region from the vehicle; and
       in response to detecting the moving object in the predetermined region, initiating a notification for the moving object to prevent collision with the vehicle; and
   detecting the vehicle is in the parked condition, the detection comprising:
       determining a geographic location of the vehicle; and
       determining that the geographic location is one from a predetermined list of unsafe locations; or
       determining that the geographic location is not one from a predetermined list of safe locations, wherein the stationary safety monitoring further comprises determining a charge level of a power supply and in response to the charge level being below a predetermined threshold level, turning on the vehicle for a predetermined duration to charge the power supply without switching off an active safety monitoring system.

2. The method of claim 1, further comprising:
in response to detecting the moving object in the predetermined region, autonomously displacing the vehicle by a predetermined amount.

3. The method of claim 1, further comprising:
selectively modifying sensor wakeup frequency based on detection of adjacent static objects.

4. The method of claim 1, wherein the notification for the moving object comprises an audible alert from at least one of a horn, a security system, and a chirp system, of the vehicle.

5. The method of claim 1, wherein the notification for the moving object comprises a visual alert from a light of the vehicle.

6. A vehicle comprising:
one or more object sensors;
one or more alert generators; and
a controller coupled with the one or more sensors and the one or more alert generators, the controller configured to perform a stationary safety monitoring when the vehicle is in parked condition, the stationary safety monitoring comprising:
  detecting presence of a moving object within a predetermined region from the vehicle; and
  in response to detecting the moving object in the predetermined region, initiating a notification for the moving object to prevent collision with the vehicle,
  wherein the vehicle, while in the parked condition, is moveable based at least in part on constraints, the constraints being based on a plurality of immovable objects surrounding the vehicle,
  wherein the controller autonomously starts the vehicle and autonomously moves the vehicle within the constraints to avoid a potential collision with the moving object, and
  wherein the controller is further configured to determine a charge level of a power supply and in response to the charge level being below a predetermined threshold level, turn on the vehicle for a predetermined duration to charge the power supply without switching off an active safety monitoring system.

7. The vehicle of claim 6, the controller further configured to detect the vehicle is in the parked condition, the detection comprising:
determining a geographic location of the vehicle; and
determining that the geographic location is one from a predetermined list of unsafe locations.

8. The vehicle of claim 6, the controller further configured to detect the vehicle is in the parked condition, the detection comprising:
determining a duration the vehicle has been stationary; and
in response to the vehicle being stationary for at least a predetermined duration, activating the stationary safety monitoring.

9. The vehicle of claim 6, the controller further configured to detect the vehicle is in the parked condition, the detection comprising:
determining a geographic location of the vehicle; and
determining that the geographic location is not one from a predetermined list of safe locations.

10. The vehicle of claim 6, wherein the notification for the moving object comprises an audible alert from at least one of a horn, a security system, and a chirp system, of the vehicle.

11. The vehicle of claim 6, wherein the notification for the moving object comprises a visual alert from a light of the vehicle.

12. A vehicle comprising:
a power supply; and
a safety monitoring system configured to perform a stationary safety monitoring when the vehicle is in parked condition, the safety monitoring system comprising:
  determining a charge level of the power supply and in response to the charge level being below a predetermined threshold level, turning on the vehicle for a predetermined duration to charge the power supply without switching off an active safety monitoring system; and
  detecting that the vehicle is in the parked condition, and in response to the vehicle being in the parked condition, detecting presence of a moving object within a predetermined region from the vehicle; and
  in response to detecting the moving object in the predetermined region, initiating a notification for the moving object to prevent collision with the vehicle.

13. The vehicle of claim 12, wherein detecting that the vehicle is in the parked condition comprises:
determining a geographic location of the vehicle; and
determining that the geographic location is not one from a predetermined list of safe locations.

14. The vehicle of claim 12, wherein detecting that the vehicle is in the parked condition comprises determining a duration the vehicle has been stationary.

* * * * *